United States Patent Office 3,441,836
Patented Apr. 29, 1969

3,441,836
PROCESS CONTROLLER WHEREIN RATE ACTION IS DEPENDENT SOLELY UPON THE PROCESS VARIABLE
John E. Riley, Saugus, Mass., assignor to General Electric Company, a corporation of New York
Filed Mar. 20, 1967, Ser. No. 624,244
Int. Cl. H02p 13/16; H02m 3/04, 5/04
U.S. Cl. 323—100                           6 Claims

ABSTRACT OF THE DISCLOSURE

A first differential controller amplifier input is connected to a set point signal source; and a second input, through a rate resistor to a process variable signal source. A proportional band network couples the controller amplifier output to the first input and the process variable signal source. Amplifying and differentiating means, energized by the process variable signal, includes the rate resistor in the output. Amplified rate signals appear across the rate resistor; however, the differential input to the controller amplifier remains substantially zero.

Background of the invention

This invention relates to automatic process control systems and more particularly to process control systems including rate action.

Before proceeding with the discussion of the background and the detailed description of the claimed invention, it will be useful to define certain terms.

A deviation signal represents the difference between a set point signal and a process variable signal.

Proportional band is the reciprocal of the controller amplifier gain or the percent of the range of the measured variable signal for which the controller amplifier produces 100 percent range in its output.

Reset action adjusts the controller output in accordance with the integral of deviation. Controllers utilizing reset continue corrective action on the process so long as deviation exists between the set point and the process variable signal.

Rate action normally affects the controller output whenever the deviation is changing by an amount dependent upon the rate of deviation change. The controller output leads the input by an amount dependent upon the rate of deviation change. So long as the deviation signal remains constant, rate action contributes nothing.

Referring to the last definition, rate action normally was a function of deviation, and therefore either set point or process variable deviation initiated rate action. In systems utilizing this scheme a small set point change would disturb the process by a factor of rate gain times set point variation. When circuit parameters are chosen in the controller amplifier to produce long time constants, such a scheme caused overshoot of the process; overshoot, as known in the art, is very undesirable.

Some circuits do produce a rate voltage dependent only upon process variable signal variations. Generally, the produced rate voltage and the deviation signal are algebraically summed and then applied to the controller amplifier input as a single signal. Therefore, the deviation signal and the rate signal are not isolated, and the controller amplifier input cannot distinguish between set point changes and process variable changes.

It is an object of this invention to provide a process controller wherein the rate signal is entirely independent of set point signal variations.

It is another object of this invention to provide a controller amplifier wherein the process variable signal is modified by the rate signal, and the combined signal produced by the rate and process variable signals is applied to a controller amplifier input independently of the set point signal.

Summary

In accordance with one embodiment of this invention, one input signal to a differential controller amplifier is constituted by the process variable signal and a process variable rate signal which is added thereto within a feedback loop constituted by the proportional band network. The process variable rate signal is obtained by differentiating an amplified and isolated process variable signal. A set point signal modified by reset and proportional band action is applied to the other differential amplified input. By applying separate signals to the differential amplifier, process control action occurs in response to the deviation between the set point and the process variable, but rate action is dependent solely upon process variable signal variations.

Brief description of the drawings

This invention is set forth with particularity in the appended claims. The organization, advantages, and further objects of the invention may be better understood by reference to the following description of a preferred embodiment of the invention taken in conjunction with the accompanying drawings and description wherein:

Description of a preferred embodiment

Figure 1:
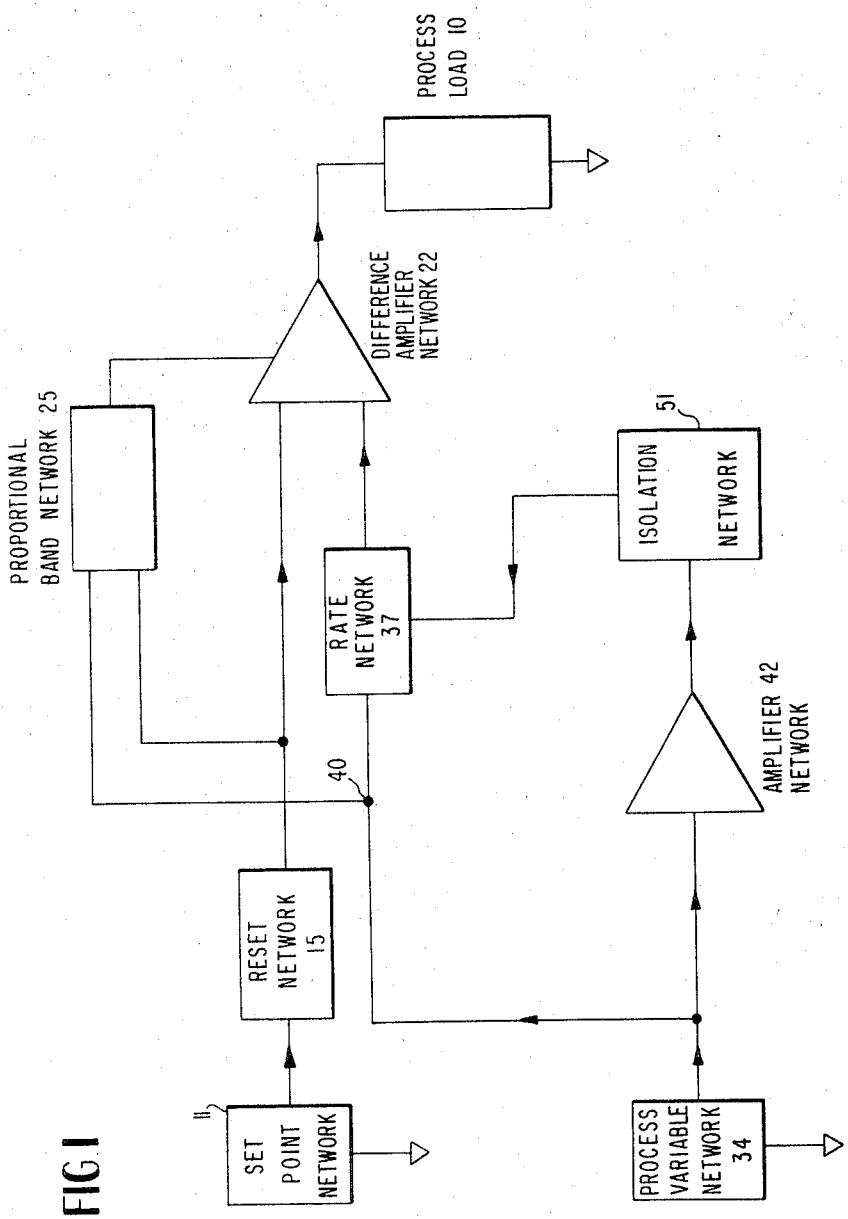
FIGURE 1 is a schematic diagram generally showing information flow in a process controller utilizing this invention.
Figure 2:
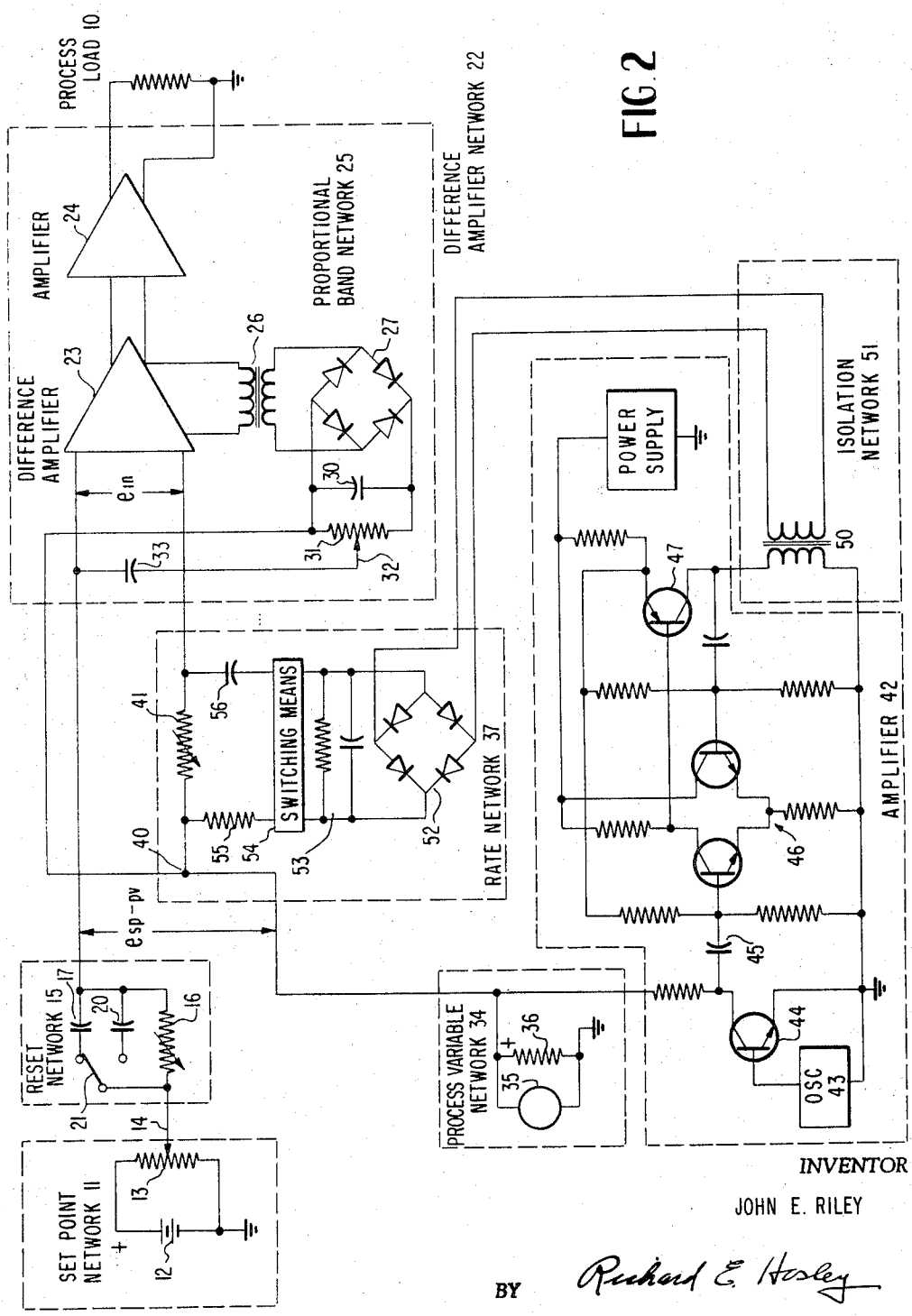
FIGURE 2 illustrates a detailed schematic of an embodiment of this invention useful in the circuit shown in FIGURE 1.

In the following description and discussion of FIGURES 1 and 2, like numerals designate like networks and elements. It is the primary object of such a system to energize a process load 10 to equalize the condition of a load with a predetermined condition as indicated by a set point network 11. Such a set point network is shown diagrammatically in FIGURE 2 as comprising a battery 12 and a potentiometer 13 which produce a constant D-C voltage set point signal on a slider 14. The set point signal is coupled to a reset network 15 which can comprise a series potentiometer 16 bypassed with a capacitor 17 to thereby constitute an RC charging circuit. An adjustable reset network can be obtained by adding a capacitor 20 adapted to be selectively coupled in parallel with the potentiometer 16 by a switching means 21. The set point signal is then coupled to one input of a difference amplifier network 22.

In accordance with a preferred embodiment of this invention, the difference amplifier network 22 should comprise a high input impedance difference amplifier 23 to take full advantage of this invention. Such amplifiers are well known in the art. For example, the diffrence amplifier 23 shown in FIGURE 2 could be constituted by an FET (field effect transistor) difference amplifier. The output of the difference amplifier 23 is then coupled through another amplifier 24 to the process load 10. A proportional band network 25, which produces a negative feedback signal, has one output connected to the set point input of the difference amplifier 23. Such a proportional band network 25 could be constituted by an isolating transformer 26, a full-wave bridge rectifier 27, and a filter network constituted by a capacitor 30 and potentiometer 31. The potentiometer produces the negative signal on the slider 32 which is coupled through a capacitor 33 to the set point input of the difference amplifier 23. Isolation is obtained by chopping a controller amplifier output signal and applying the chopped signal to an isolating means such as the transformer 26.

The process variable signals constitutes the other difference amplifier input and is produced by a process variable signal network 34 constituted by a generator 35 and a resistor 36. The generator 35 can be constituted by any known means such as a thermocouple probe, a pressure transducer, or other device which produces an electrical output proportional to the condition of the process being controlled.

This second input to the difference amplifier 23 produced by the process variable network 34 is coupled to the difference amplifier 23 through a rate network 37 so that the rate network 37 is within the feedback loop formed by the proportional band network 25. More specifically, a high impedance variable resistor 41 couples the process variable signals from the process variable network 34 to the process variable input of the difference amplifier 23.

Rate action is produced by applying the process variable signal to the input of an amplifier network 42. A typical amplifier network could comprise a transistorized chopper circuit including an oscillator circuit 43 and a chopper transistor 44 to produce a pulse output capable of being coupled through a capacitor 45 to a high-gain alternating current amplifier 46. The amplified alternating current output drives an output transistor 47 having the primary winding of a transformer 50 in series with the collector. This transformer constitutes an isolating network so the amplified process variable signal across the transformer 50 and the process variable signal from the process variable network 34 are isolated.

The transformer secondary is coupled to a rectifier circuit 52 in the rate network 37. D-C output voltages from the rectifier circuit 52 are filtered by a conventional filter circuit 53 so the D-C output signal from the filter circuit 53 is an amplified D-C voltage which varies linearly with the process variable signal.

To provide a rate network which is universal, switching means 54 are used to allow polarity of the D-C output voltage to be reversed. If such a switching means is used, forward or reverse rate action can be obtained.

The actual rate voltage is obtained by a differentiating circuit comprising the variable resistor 41, a resistor 55, and a capacitor 56. The resistor 55 is a protective resistor to obviate problems introduced if the resistor 41 is set at a zero value. Therefore, in the following discussion its effect is disregarded. As differentiating circuits are well known in the art, it is sufficient to say that a voltage is produced across the resistor 41 which is proportional to the derivative of a D-C voltage appearing across the filter circuit 53. In this particular circuit the voltage across the resistor 41 is proportional to the rate of change of the process variable signal.

The operation of a process control system using this invention can best be illustrated by discussing a specific example of the circuit. Assume that the process variable signal varies between 1 volt and 5 volts, that the overall gain of the D-C output voltage at the switching means 54 is 9, that the resistance 41 is 100 megohms, and that the capacitor 56 is 1.5 mfd. Assume that the system is balanced and that the set point network 11 and the process variable network 34 each produces a voltage equal to 1 volt. Then $e_{in}$ equals zero and $e_{sp-pv}$ equals zero. If the set point is changed to 2 volts, then $e_{in}$ and $e_{sp-pv}$ remain at zero because the proportional band network maintains them at a zero voltage. Therefore, the voltage drop across the resistance 41 is zero, and no rate voltage is generated. However, if the process variable signal varies from 1 to 2 volts in a unit time while the set point voltage remains at 1 volt, a voltage appears across the resistor 41 which is 10 times the actual rate voltage or 10 volts per unit time. This amplification of 10 times is produced because the 1 volt variation causes a rate voltage of 1 volt per unit time to be produced across the resistor 41, and to this will be added a rate voltage caused by a change of 9 volts across the filter circuit 53. As the controller amplifier 23 and the proportional band network 25 maintain $e_{in}$ at zero, $e_{sp-pv}$ will not equal zero, and rate action commences as the capacitor 56 discharges through the resistor 41. When the above-mentioned circuit elements are used, rate action can be obtained for a period of about 23 minutes because the time constant for the rate circuit 37 is equal to the product of the values of the rate resistor 41, the capacitor 56, and the rate gain.

This example illustrates the advantages of this invention. Set point changes cause no rate voltage to be produced, thereby minimizing overshoot problems. An amplified rate voltage which is proportional to the rate of change of the process variable signal is obtained to provide more positive rate action. Furthermore, the rate time which can be obtained is increased by a factor of the rate gain so that rate times approach normally encountered reset times.

It will be obvious to those skilled in the art that many modifications can be made to this circuit. Different amplifier networks, various differentiating networks and other circuit substitutions can be effected without departing from the true spirit and scope of the invention.

What is claimed as new and desired to be secured by Letters Patent of the United States is:

1. A process control system comprising:
   (a) differential controller amplifier means having first and second input terminals and output terminal means adapted to be connected to a process actuator;
   (b) means for generating a set point signal;
   (c) first coupling means connecting said first differential amplifier input terminal to said set point generating means;
   (d) means for generating a process variable signal indicating the condition of the control process;
   (e) second coupling means connecting said process variable signal generator means to said second differential amplifier input terminal;
   (f) process variable signal amplifier means connected to said process variable signal generator means; and
   (g) third coupling means connecting said process variable signal amplifier means and said second coupling means including means for differentiating the signal from said process variable signal amplifier means, said third coupling means coupling the differentiated voltage to said second coupling means.

2. A process control system as recited in claim 1 wherein said second coupling means comprises a resistor in series between said controller amplifier means and said process variable generating means, the differentiated voltage being impressed across said resistor.

3. A process control system as recited in claim 2 wherein said process variable signal amplifier means produces an amplified A-C voltage dependent upon the magnitude of the process variable signal and said third coupling means includes rectifying means to convert the amplified A-C signal to a D-C signal proportional to said process variable signal.

4. A process control system as recited in claim 3 wherein said differentiating means includes a capacitor and said resistor in said second coupling means, said D-C signal proportional to said process variable signal being coupled to said resistor through said capacitor.

5. A process control system as recited in claim 4 wherein said differential controller amplifier means includes negative feedback means, said negative feedback means producing a voltage coupled to said first controller amplifier input terminal and to said process variable signal generating means.

6. A process control system comprising:
   (a) high-gain, high-input impedance differential controller amplifier means having first and second input terminals and an output terminal adapted to be coupled to a process actuator;
   (b) means for generating a set point signal;

(c) first coupling means connecting said set point signal generating means to said first controller amplifier input terminal comprising reset circuit means in series with said set point generator means;

(d) means for generating a process variable signal indicating the condition of the control process;

(e) a resistor connected to said process variable signal generating means and to said second controller amplifier input terminal;

(f) process variable signal amplifier means connected to said process variable signal generating means to produce an amplified alternating current output voltage proportional to the magnitude of said process variable signal;

(g) differentiating means including a rectifier connected to said process variable signal amplifier means and differentiating circuit means including said resistor and a capacitor, said differentiating means producing a voltage across said resistor proportional to the rate of change of said process variable signal; and (h) negative feedback means connecting the output of said controller amplifier means to said first input terminal and to a junction constituted by the connection of said resistor and said process variable signal generator means.

References Cited

UNITED STATES PATENTS

| | | | |
|---|---|---|---|
| 3,219,936 | 11/1965 | Eksten et al. | 328—69 |
| 3,351,862 | 11/1967 | Cranch | 328—69 X |
| 3,377,547 | 4/1968 | Ohlson | 323—100 |

JOHN F. COUCH, *Primary Examiner.*

W. H. BEHA, JR., *Assistant Examiner.*

U.S. Cl. X.R.

318—18, 448; 328—69